United States Patent [19]

Greüne et al.

[11] Patent Number: 4,543,783
[45] Date of Patent: Oct. 1, 1985

[54] APPARATUS FOR THE DISPLACEMENT OF THRUST REVERSERS OF TWO JET ENGINES OF AN AIRPLANE

[75] Inventors: Christian Greüne, Furstenfeldbruck; Hilbert Holzhauer, Stetten, both of Fed. Rep. of Germany

[73] Assignee: Motoren-und Turbien-Union Munchen, Munich, Fed. Rep. of Germany

[21] Appl. No.: 503,633

[22] Filed: Jun. 13, 1983

[30] Foreign Application Priority Data

Jun. 16, 1982 [DE] Fed. Rep. of Germany ....... 3222674

[51] Int. Cl.[4] .............................................. F02K 1/54
[52] U.S. Cl. ..................... 60/226.2; 60/230; 244/110 B
[58] Field of Search ............. 60/226.2, 230; 239/265.33, 265.37; 244/110 B

[56] References Cited

U.S. PATENT DOCUMENTS 3,655,134 4/1972 Greenland et al. ................. 60/230
3,931,944 1/1976 Capewell et al. .................... 60/230
4,297,844 11/1981 Halin et al. ........................ 60/226.2

FOREIGN PATENT DOCUMENTS 1334518 10/1973 United Kingdom ............ 244/110 B

Primary Examiner—Louis J. Casaregola
Attorney, Agent, or Firm—Roberts, Spiecens & Cohen

[57] ABSTRACT

Apparatus for the synchronized displacement of two thrust reversers for two jet engines of an airplane, comprising first and second systems for displacing respective thrust reversers. Each system includes a compressed air motor, a valve controlling the operation of the motor by controlling the flow of compressed air thereto, and an input system for operating each valve to control the displacement of the respective motor. A synchronizing system synchronizes the displacement of the thrust reversers by measuring displacement in the first and second systems at respective corresponding locations and controlling the operation of the first and second motors such that the displacements of the thrust reversers by the respective motors are equalized.

20 Claims, 11 Drawing Figures

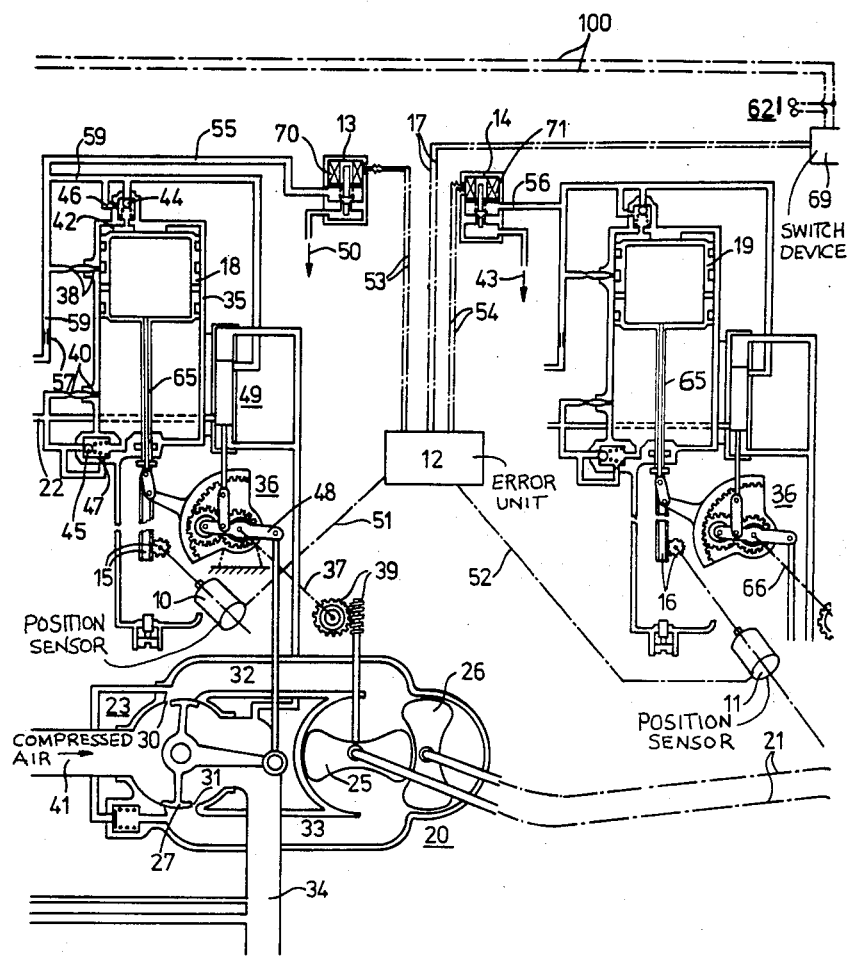

APPARATUS FOR THE DISPLACEMENT OF THRUST REVERSERS OF TWO JET ENGINES OF AN AIRPLANE

FIELD OF THE INVENTION

The invention relates to apparatus for the retraction and extension displacements of two thrust reversers for two jet engines of an airplane. In particular, the invention relates to apparatus for the synchronized displacement of the two thrust reversers.

Each thrust reverser is included in a respective system comprising a compressed air motor for driving the thrust reverser, a valve for controlling the operation of the motor by controlling the flow of compressed air thereto and a system for operating the valve to control the displacement of the respective motor.

PRIOR ART

West German application (DE-OS No. 2 413 702) discloses a single system incorporating a thrust reverser of a jet engine including means to unlock a locking device of the thrust reverser in order to permit the extension thereof.

The present invention is directed to an arrangement in which separate systems are employed for displacing respective thrust reversers and a problem arises in that the two thrust reversers generally are displaced at different speeds due to uncontrollable conditions such as different air leakages at input piston drives, different magnitudes of friction in differential transmissions of drive and in the bearings and in flexible drive shafts of flaps of the reversers and different magnitudes of air supply pressure for the two systems. Such different air leakages exert a great influence due to the relatively small working volume in the cylinders of the input system drives. The bearings are incorporated in the differential transmissions, the piston rods of the input piston drives and in levers on differential transmissions between the input pistons and compressed air motors.

SUMMARY OF THE INVENTION

An object of the present invention is to provide apparatus for the synchronized displacement of two thrust reversers for two jet engines of an airplane in which the speeds of extension of the thrust reversers will be substantially synchronized.

A further object of the invention is to provide a apparatus by which the extension displacement of the two thrust reversers will be substantially synchronized.

In order to satisfy the above and further objects of the invention, the displacement of the thrust reversers is synchronized by measuring the displacement in first and second systems of the respective thrust reversers at respective corresponding locations and controlling the operation of the first and second drive motors such that the displacements of the thrust reversers by the respective motors will be equalized.

In further accordance with the invention, by the provision of a synchronizing association between the respective systems of the thrust reversers, the extension of the two thrust reversers will be synchronized and final extension will be achieved at substantially the same time.

A further object of the invention is to provide a synchronizing means which can be operated reliably and which is composed of dependable and relatively simple elements.

Yet, another object of the invention is to provide a synchronizing system which can be deactivated during retraction of the thrust reversers to their initial retracted state.

In accordance with a feature of the invention, each of the valves which controls the operation of the compressed air motor is subject to the action of an input system which comprises a piston. The synchronizing means comprises a displacement sensor in each thrust reverser system which is operatively associated with the respective piston to measure its travel and signals from the displacement sensors are compared to determine relative travel of the pistons of the two systems.

In accordance with a further feature of the invention, the input system employs electric motors rather than pistons and each of the motors operates a respective sensor whose signals are fed to an electronic control means in which the outputs of the sensors are compared.

In addition to measurement at the input to the systems, measurement can also be made at the output drive for the thrust reversers.

In accordance with a further feature of the invention, a mechanical means can be employed to detect synchronization of the drive of the respective thrust reversers.

In each of the systems for displacing a respective thrust reverser, a feedback gearing is provided between the compressed air drive motor and a differential transmission connected to the input piston. A feature of the invention is to measure the displacement in the thrust reverser systems at the feedback gearing since it is generally stepped down and therefore provides a more accurate measure of the displacement. This is to be contrasted with the generally more reliable measurement at the output near the final location of drive of the thrust reversers but where measurement may be more difficult.

According to yet another feature of the invention, the apparatus comprises means for eliminating the synchronizing connection between the two systems in the case of disturbance or failure of one of the jet engines or thrust reversal systems. Otherwise, the defective inactive thrust reversal systems would block the non-defective operative thrust reversal systems. In general, locking switches are employed for eliminating the synchronizing connection. Such locking switches can be operative during retraction of the thrust reversers.

BRIEF DESCRIPTION OF THE FIGURES OF THE DRAWING

FIGS. 1A and 1B respectively show the left and right ends of a displacement system for thrust reversers of a jet engine according to the invention.

DETAILED DESCRIPTION

Figure 1B:
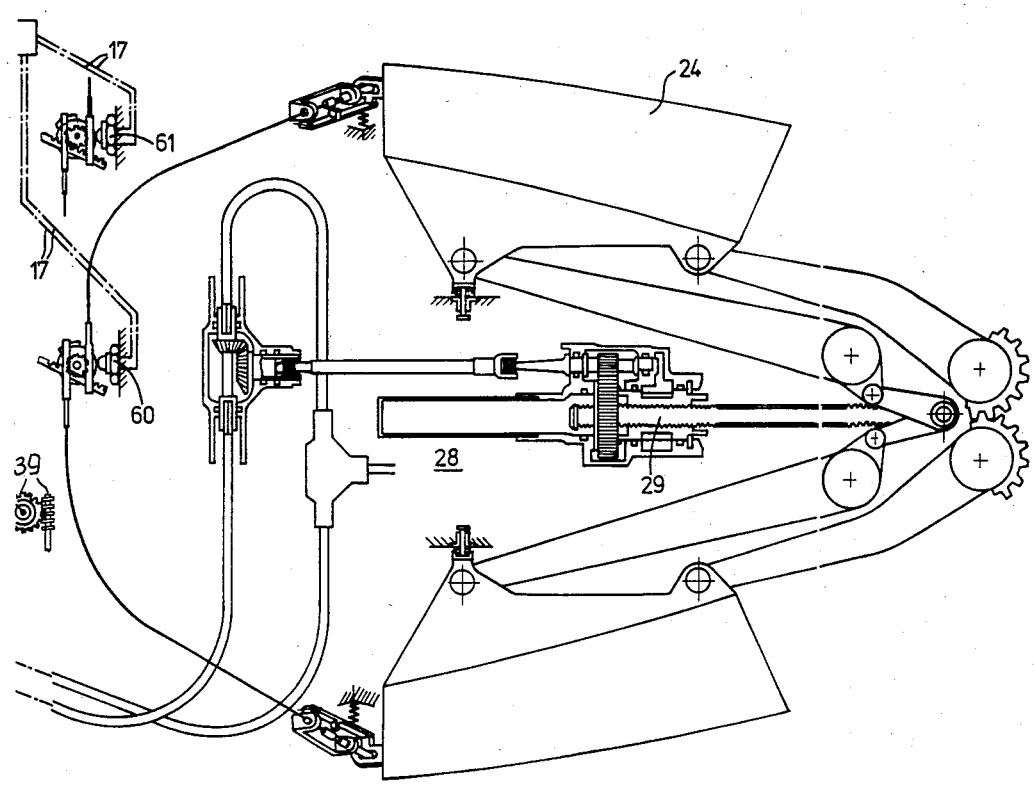

In the drawing are shown, embodiments of apparatus for the displacement of thrust reversers of a jet engine constituted by two flaps 24 denoted as thrust reversal flaps respectively associated with two identical compressed air motors 20. The flaps 24 are each associated in a respective independent system with motor 20. For the sake of simplicity, only one of the two motors 20 has been shown. Each motor 20 has two rotary bodies 25 and 26 whose directions of rotation can be jointly reversed. Each motor 20 actuates its associated thrust reverser to extend and retract the flap 24, depending on the direction of rotation of the rotary bodies 25,26 via a flexible shaft 21 and a transmission 28. The flaps 24 are shown fully retracted in the drawing. Two spindles 29 in the respective transmissions 28 are axially displaced parallel to each other in accordance with the rotation of the rotary bodies 25,26. A given displacement or angular position of the flaps 24 is associated with each point of the path of travel of the bodies 25,26. For each motor 20, the displacement system further includes a respective rotary slide valve 23 for controlling the flow of compressed air to the motor. The motor 20 and the rotary slide valve 23, together with two channels 32 and 33 which connect them together form a structural unit. Compressed air can be fed to the rotary slide valve 23 by a compressor (not shown) of the jet engine via a feed conduit 41 which contains a shut-off valve (not shown). By means of a rotary slide valve member 27, the flow of compressed air through two diametrically opposite ports 30 and 31 of identical size can be controlled, and depending on the direction of rotation for the opening of the rotary slide valve member 27, the rotary bodies 25, 26 can be driven by the compressed air in one or the other direction of rotation. The exhaust air is discharged through a discharge conduit 34.

Figure 3A:
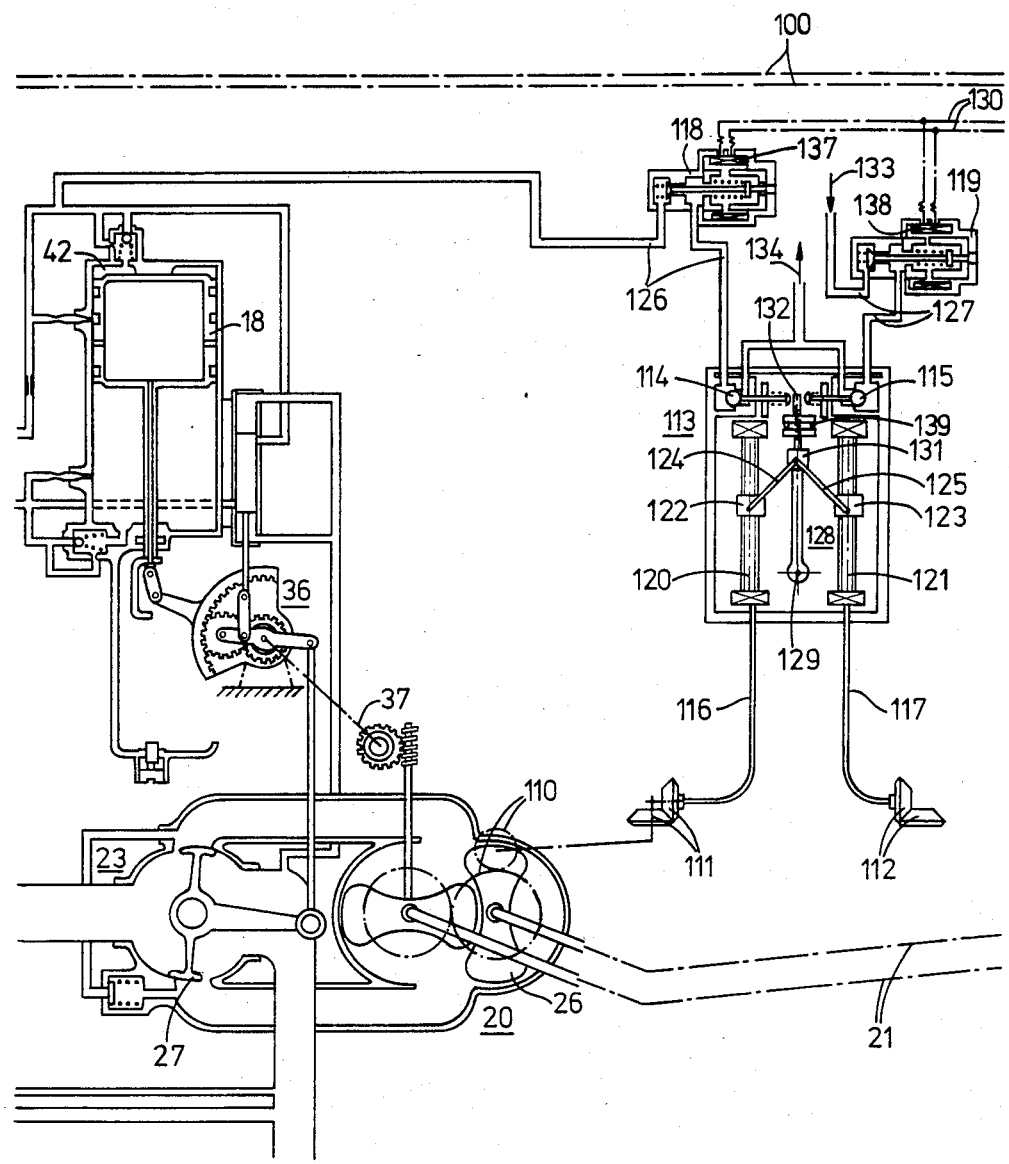
FIGS. 3A and 3B respectively show a portion of a further embodiment of a displacement system, the right end being broken away and otherwise similar to the embodiment in FIGS. 1A and 1B.
Figure 4A:
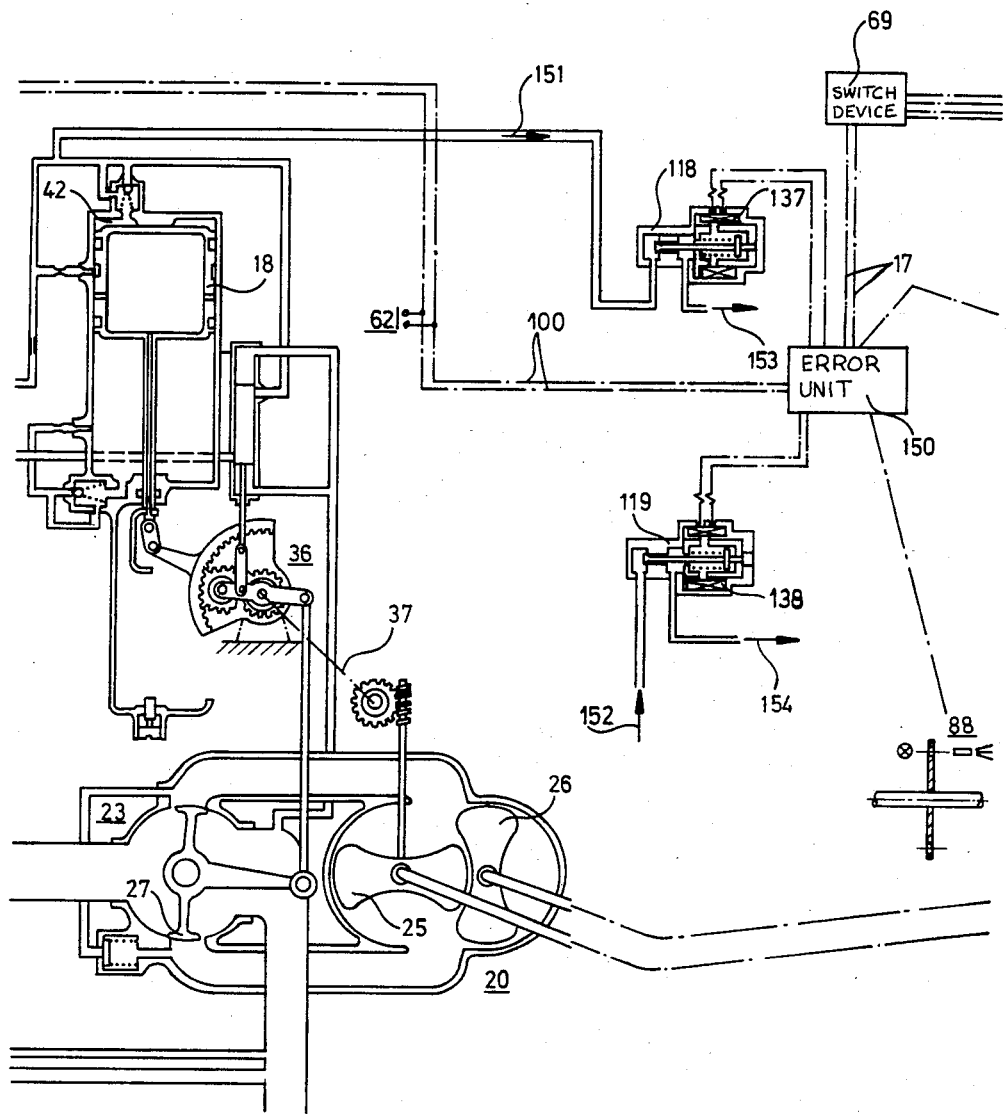
FIGS. 4A and 4B respectively show a portion of a further embodiment of a displacement system, the right end being broken away and otherwise similar to the embodiment in FIGS. 1A and 1B.
Figure 5A:
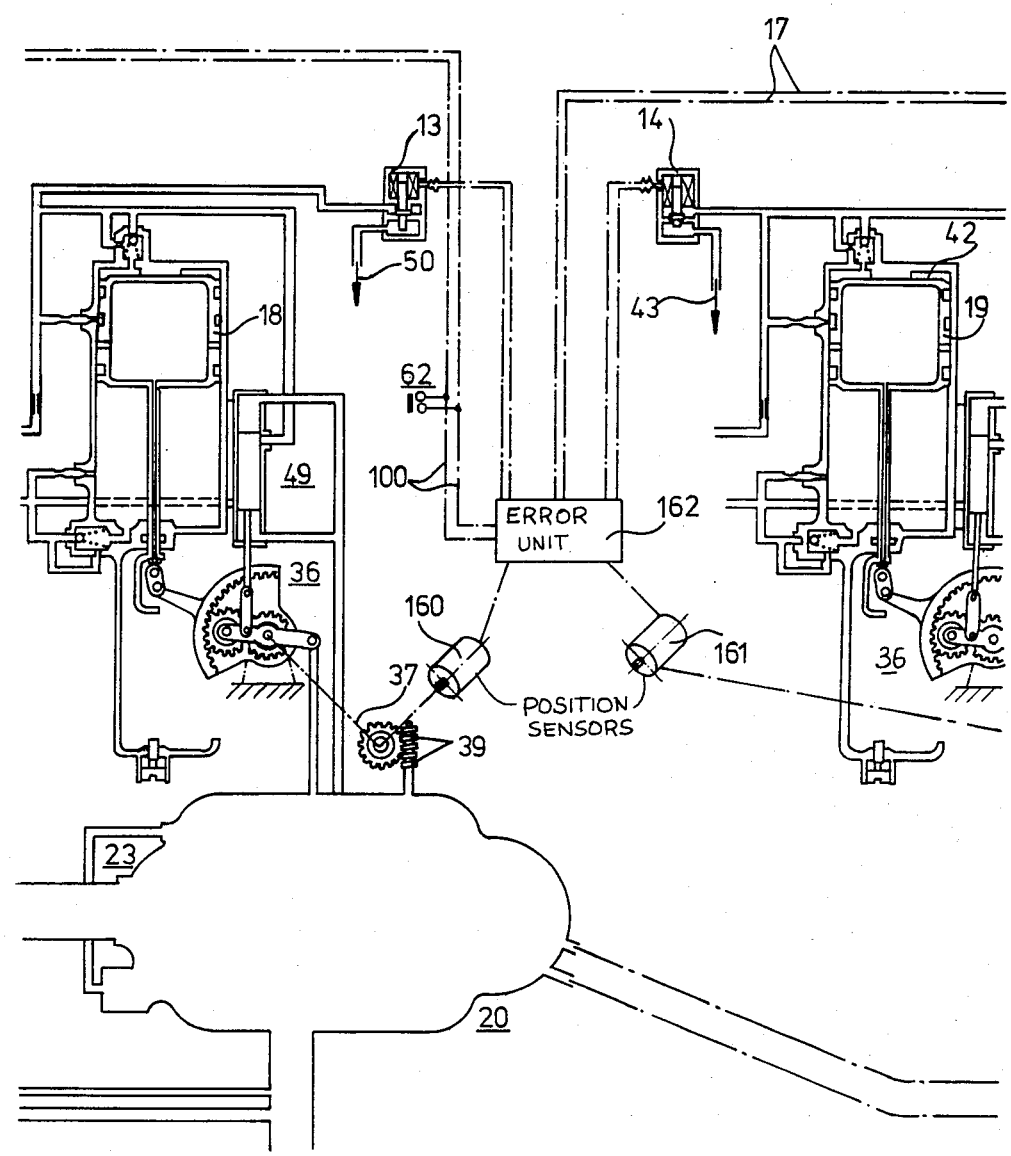
FIGS. 5A and 5B respectively show a portion of a further embodiment of a displacement system, the right end being broken away and otherwise similar to the embodiment in FIGS. 1A and 1B.

The displacement system further comprises two identical set-point indicators or nominal valve setters for actuating the rotary slide valves 23. In FIG. 1A the set-point indicators comprise respective input pistons 18 and 19 serving as set-point pistons or time preset pistons. In the embodiments of FIGS. 3A and 4A, the same system of set-point indicators as shown in FIGS. 1A and 5A is employed, however, piston 19 is not shown for simplification. The rotary slide valve member 27 is actuated by the associated input piston through its piston rod 65 and a differential transmission 36, the piston being displaceable or controllable by the action of compressed air within a cylinder 35. The transmission 36 of each piston is subject to the action of the corresponding motor 20 via respective feedback systems 37,66, each feedback system having a step-down worm gearing 39. If the input piston 18 or 19 is acted on by compressed air from above in its upper position as shown, the piston will be moved downwards and the associated flap 24 will be extended. The motor 20, rotary slide valve 23 and differential transmission 36 together serve as a follower system which follows the movement of the input piston. This constitutes a position controller. As a result, displacement of the piston 18 or 19 will produce proportional displacement of its associated flap. The position of a lever 48 on the differential transmission 36 is a measure of the control deviation. By means of a slide valve 49, increase in the control deviation above a permissible amount is prevented. For the control of the input pistons 18 and 19 by compressed air, there are used a follow-up valve (slide valve) (not shown), two non-return valves 44 and 45 provided at the ends of the cylinder 35 for the admission of the compressed air into the corresponding high-pressure space 42 of the cylinder 35, and two throttle openings 46,47 of the cylinder 35 which are provided at said ends and four throttle openings 38 and 40 provided in front of said ends. From the follow-up valve an air conduit 59 extends to the throttle openings 38 and 46 and to the non-return valve 44, and an air conduit 22 extends to the throttle openings 40 and 47 and to the non-return valve 45. The desired direction of movement of the input piston for extending or retracting the thrust reverser is obtained for each input piston by a corresponding adjustment of a corresponding direction-selection valve (not shown) by means of compressed air via the follow-up valve.

In accordance with FIG. 1, the displacement system includes a synchronizing system for extending the two thrust reversers or pairs of flaps 24 in synchronization. This is effected by measuring the displacement or travel of the two input pistons 18 and 19 by two idenical, inductive rotary sensors 10 and 11 of the synchronizing system, and the synchronization is effected by venting the leading or advanced input piston 18 or 19. The rotary sensors 10 and 11 are actuated by pinions of two idential rack gearings 15 and 16 whose racks are provided on an extension of the piston rods 65. The synchronizing system further includes an electric error unit 12 to which are connected the rotary sensors 10 and 11 and two identical electric vent valves 13 and 14 via electric lines 51 and 54. The vent valves 13 and 14 can be electrically switched between open and closed states by electromagnets 70 and 71 respectively for passing and closing off the flow of air. The error unit 12 compares the measured values of the rotary sensors 10 and 11 with each other. The vent valves 13 and 14 are connected via separate vent lines 55 and 56 respectively with the air conduit 59 at a point between throttle point 57 of the air conduit 59 and the throttle opening 46. If the displacement travel of the input pistons 18 and 19 differ from one another as measured by the sensors 10 and 11, the vent valve 13 or 14 associated with the leading input piston 18 or 19 is opened by a control pulse from the error unit 12 until the high pressure space 42 in the respective cylinder 35 is vented via the throttle opening 46, compressed air conduit 59 and vent conduit 55 or 56 in the direction of outflow arrows 50 and 43 until synchronous extension movements of the two input pistons 18 and 19, and thus of the two thrust reversers, are obtained. Thereby, the two thrust reversers are continuously and automatically synchronized.

An electrical time-delay circuit 17 including blocking switches 60 and 61 is provided for the two pairs of flaps 24 to eliminate the synchronizing connection when one of the two jet engines or thrust reversal systems is disturbed or fails. At such time, a signal is produced to eliminate the synchronizing connection via a switching device 69 connected in the time delay circuit to the error unit. If, due to such a disturbance or failure, the corresponding blocking switch 60 or 61 remains closed for a short time, for instance 0.1 seconds, after the setting of the two direction-selection valves to "extension," then, via the switch device 69 which is set to this time interval, first the vent valves 13 and 14 are closed by the error unit 12 whereupon the direction-selection valves are switched to "retract." If it is then desired to extend only the thrust reverser corresponding to the non-defective engine or system, the two direction-selection valves are switched to "extend" by the pilot opening a manual switch 62. In that case, the synchronizing connection remains eliminated since the electric error unit 12 (or in the other figures, elements 86, 150,162 or 170) is so programmed. The switch 62 is connected in an electric conductive system 100 between the error unit or the switch device 69 and the direction-selection valves.

Figure 2A:
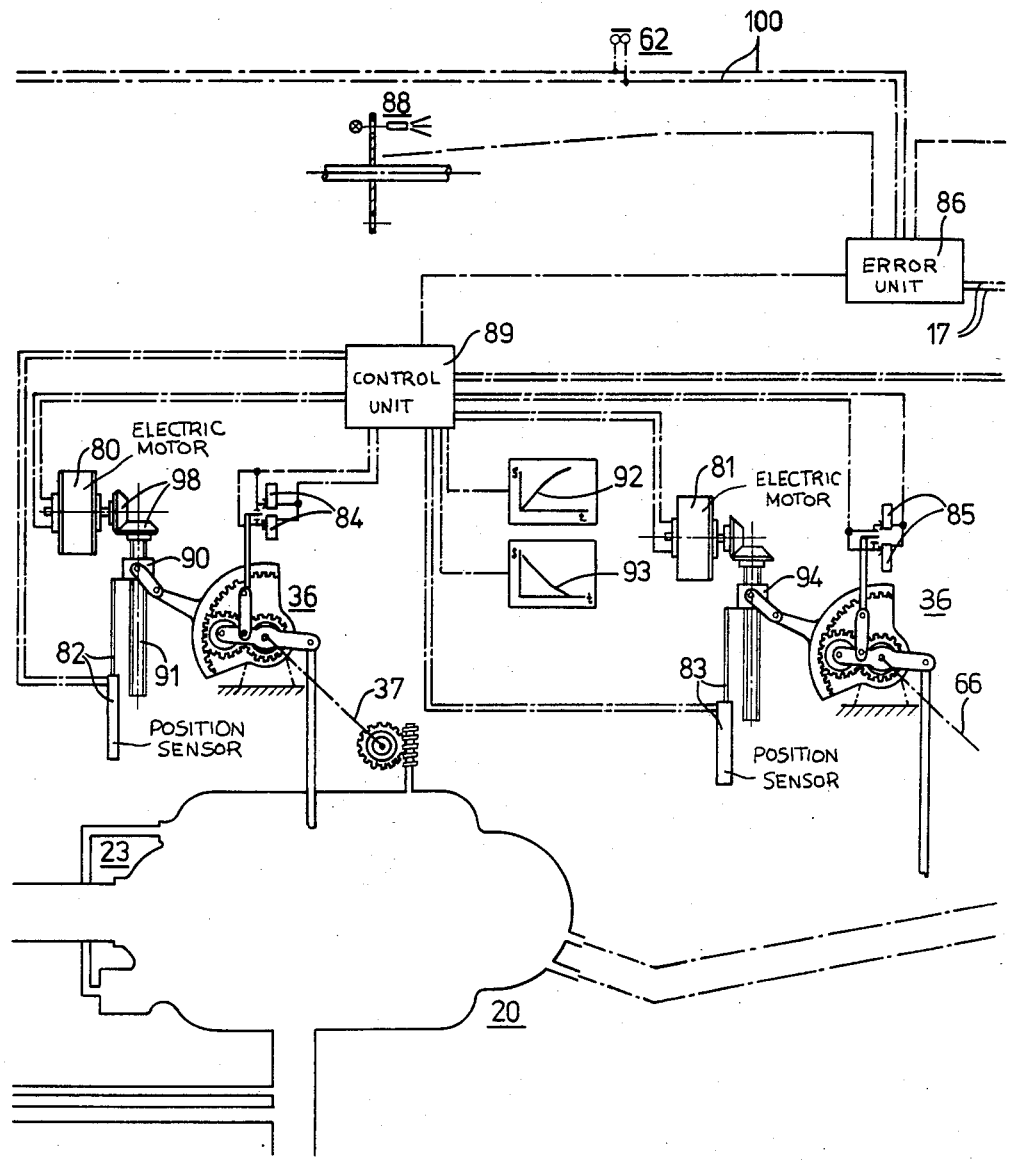
FIGS. 2A and 2B respectively show a portion of another embodiment of a displacement system, the right end being broken away and otherwise similar to the embodiment in FIGS. 1A and 1B.
Figure 2B:
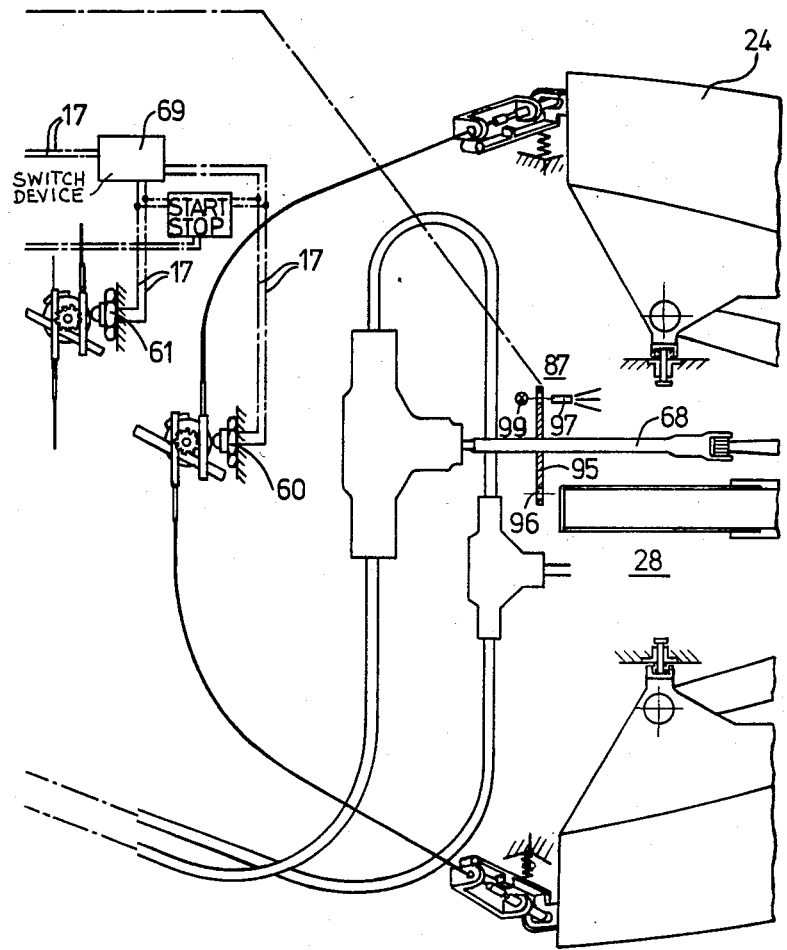

As seen in FIGS. 2A and 2B, instead of the input pistons 18 and 19 there are provided two identical electronically controlled electric motors 80 and 81. Since there are no input pistons (18,19) there are, furthermore, no air conduits between the follow-up valve and the input pistons (18,19). The angle of rotation or the number of revolutions of the rotor of the electric motor 80 and 81 or the strokes of a nut 90 (instead of the piston rod 65) or 94, displaceable by said rotor as a function of time t, and therefore the turning-angle/time parameters of the electric motors 80 and 81 or the stroke/time parameter of nut 90 or nut 94 is controlled by an electronic control unit 89 in accordance with a curve 92 for flap extension and a curve 93 for flap retraction. The rotary slide valve member 27 in this embodiment is actuated by the electric motor 80 or 81 or the nut 90 or 94 via the differential transmission 36, which is also influenced by the motor 20 via the associated feedback system 37 or 66. The nuts 90 and 94 are seated on respective threaded spindles 91 which are turned by the rotors of the associated electric motors 80 and 81, via a pair of bevel gears 98 arranged at 90° whereby the nuts 90 and 94 are moved axially. If the nut is moved downwards from its upper position (shown in the drawing) corresponding to retracted position of the flaps 24, then the flaps 24 are extended thereby. The desired direction of movement (extension or retraction) of the two thrust reversers is selected by the pilot by suitably setting the two direction-selection valves whereby, inter alia, the electric motors 80 and 81 are actuated via the electric wiring system 100, the error unit 86 and the control unit 89. Instead of the two slide valves 49 as used in FIG. 1A, two torque limiters 84 and 85 are provided for the two electric motors 80 and 81.

The electric motors 80 and 81 are used for the synchronization of the flaps 24. By means of the nuts 90 and 94, not only is the corresponding rotary slide valve member 27 actuated but also actuated are corresponding inductive position sensors 82 and 83. The position sensors 82 and 83 are parts of the synchronizing system and their measured values of the magnitude of displacement are fed into the control unit 89 where they are compared with each other and, in case of inequality, the control unit 89 transmits control pulses to the leading one of the electric motors 80,81 in such a direction that said motor slows down and assumes the same speed as the other electric motor so that the nuts 90,94 and thus the two thrust reversers are automatically moved or extended substantially synchronously. In this sense the control unit 89 forms part of the synchronizing system.

In addition, as shown in FIGS. 2A and 2B, the synchronizing system has two optical-electrical devices 87 and 88 for providing an output corresponding to the number of revolutions of the two air motors 20 since, in general, the efficiencies of the motors 20 differ as does their frictional losses and the friction in the subsequent transmission elements. The counting devices 87 and 88 each comprises a disk 95 which is fixed on the shaft 68 of the associated transmission device 28, the disk having a coaxial ring of holes 96, a lamp 99 on one side of the disk at the level of the ring of holes and a light-sensitive pulse counter 97 on the other side of the disk in facing relation with the lamp. The pulse counters 97 of the counting devices 87 and 88 measure the positions of the two thrust reversers as measured by the number of revolutions of the shafts 68. The corresponding measured values are compared with each other in the error unit 86 and if they differ, the control unit 89 is operated so that synchronization is automatically obtained.

In this embodiment, the electric time-delay circuit 17, including the switch device 69, etc. serves to eliminate the synchronizing connection in the event of a disturbance or the like of one of the thrust reversers. The synchronizing connection is eliminated by the error unit 86 via the control unit 89, and the direction of rotation of the electric motors 80 and 81 is changed for the retraction of the two thrust reversers.

Figure 3B:
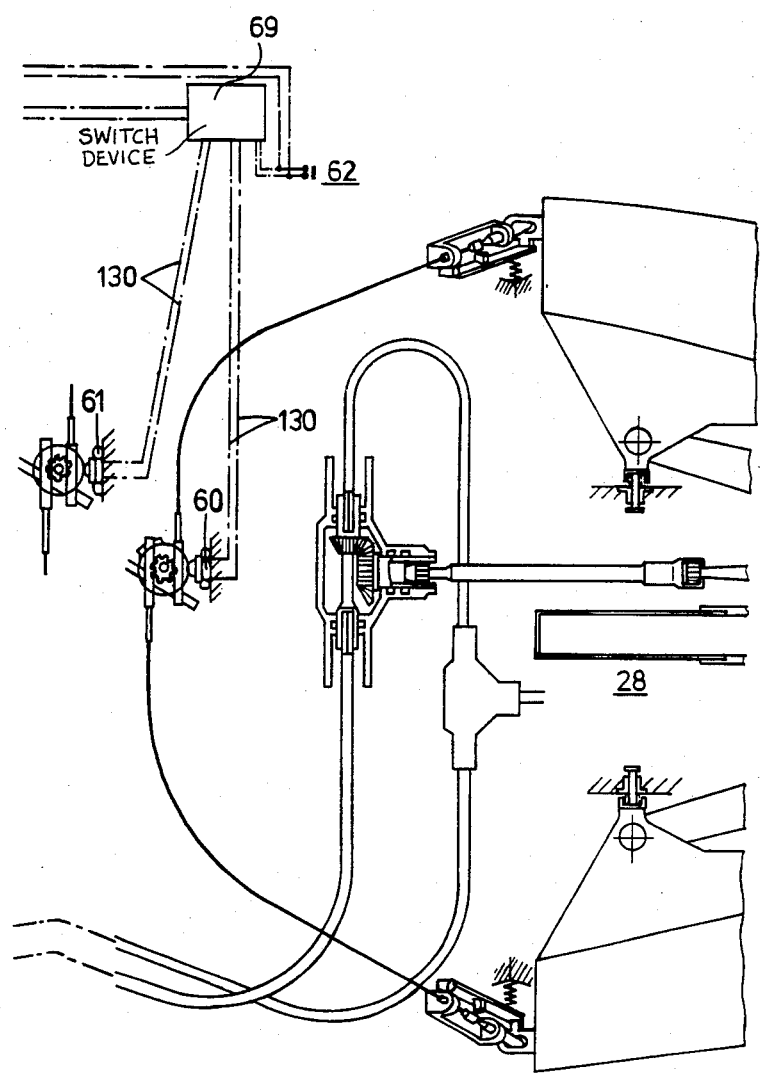

In FIGS. 3A and 3B, the displacement travel is measured at the outputs of the displacement system. The synchronizing system includes a mechanical differential 113 which measures the difference between the two thrust-reverser positions by measuring the difference in the angular travel, i.e. number of revolutions of the two air motors 20, and serves to vent the high-pressure space 42 of the faster input piston 18 or 19 coupled to two identical gear output devices 110 for the rotary members 26 are two pairs of 90° bevel gears 111 and 112. The rotary bodies 26 drive in rotation two parallel, axially fixed, threaded spindles 120 and 121 of the differential 113 via the gear output devices 110, the pairs of bevel gears 111 and 112 and two adjoining flexible drive shafts 116 and 117. Upon extension of the flaps 24, nuts 122 and 123 threaded on the threaded spindles 120 and 121 are moved downwards, as seen in FIG. 3A. The differential 113 includes rods 124 and 125 which are articulated at one end to the nuts 122 and 123 and at the other end to a socket 131 disposed between the threaded spindles 120 and 121 above the nuts 122, 123 to form a knee-joint linkage which fixes the nuts 122 and 123 with respect to rotation while permitting different paths of travel of the nuts. The socket 131 at the knee of the knee-joint linkage is longitudinally displaceable on an elongated swing lever 128 of the differential 113 which swing lever extends between the threaded spindles 120 and 121 in its normal position parallel to them. The swing lever 128 is supported for pivotal movement relative to the threaded spindles 120 and 121 around a fixed shaft 129 which lies below the nuts 122, 123.

If one of the pistons 18 and 19 and thus one thrust reverser leads the other, then the corresponding leading nut 122 or 123 effects a swinging movement of the swing lever 128 towards it and causes opening of an outlet valve 114 or 115 of the differential 113 by the end 132 of the swing lever 128 which lies above the nuts 122 and 123. Thereby, the high-pressure space 42 of the leading input piston 18 or 19 is vented and the movement of the leading thrust reverser is halted until the two thrust reversers extend substantially in synchronism. The flow of vented air is indicated by the arrows 133 and 134. During the entire process of extension of the thrust reversers, and therefore also upon such a venting, two identical electromagnetically controlled vent valves 118 and 119 which are provided in conduits 126 and 127 and which extend from the high pressure spaces 42 to the outlet valves 114 and 115 are opened. The vent valves 118 and 119 are opened at the start of the extension of the thrust reversers by excitation of electromagnets 137 and 138 of the vent valves 118 and 119.

If one jet engine or the like fails, both vent valves 118 and 119 are closed by their electromagnets 137 and 138 to eliminate the synchronizing connection. The signal for this is given by an electric time-delay circuit 130 from the switches 60 and 61 via the switch device 69.

The swing lever 128 has an over-load safety 139 located between swing end 132 and the socket 131 which, upon too great a difference between the positions of the nuts 122 and 123 and therefore too great an angle of swing of the swing lever 128 (caused in general by failure of one of the two jet engines or thrust-reversal systems) resiliently holds back the swing end 132 so that the differential 113 is not damaged.

Figure 4B:
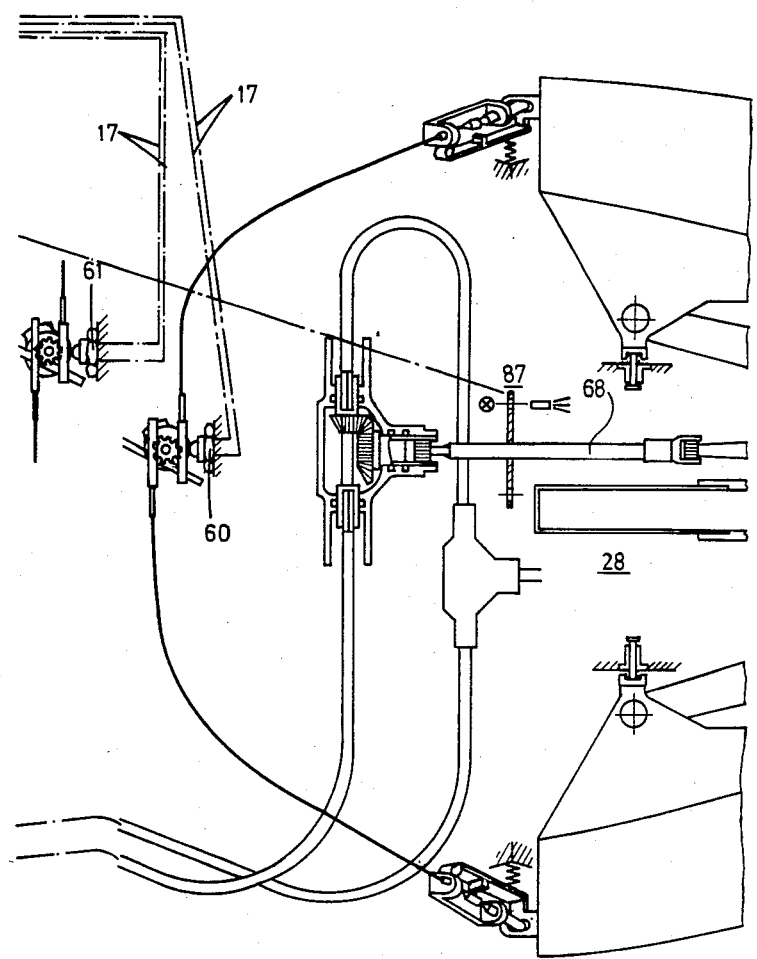

FIGS. 4A and 4B show a system in which the displacement travel is measured at the outputs of the displacement system. The synchronizing system includes two optical-electrical devices 87 and 88 for counting the number of revolutions of the two shafts 68 to provide a measure of the rotation of the two air motors 20. The counting devices 87 and 88 are identical to those described in FIGS. 2A and 2B and its elements are given the same reference numerals and will not be described further hereafter. The difference in the number of revolutions of the two air motors 20 i.e. of the rotary bodies 25,26 thereof as indicated by the rotation of the shafts 68 is measured by the counting devices 87 and 88 and converted into electrical signals by an electric error unit 150. Electromagnetic vent valves 118 and 119 serve to vent the high pressure space 42 of the input pistons 18 and 19 and the vent valve of the faster input piston receives the signal to vent the corresponding high pressure space 42 in accordance with valve inflow arrows 151 and 152 and valve outflow arrows 153 and 154 until the flaps 24 of the two thrust reversers are extended substantially synchronously.

If one jet engine or the like fails, both vent valves 118 and 119 are closed by their electromagnets 137 and 138 under the action of the switches 60 and 61, the electric time-delay circuit 17 and the electric error unit 150.

Figure 5B:
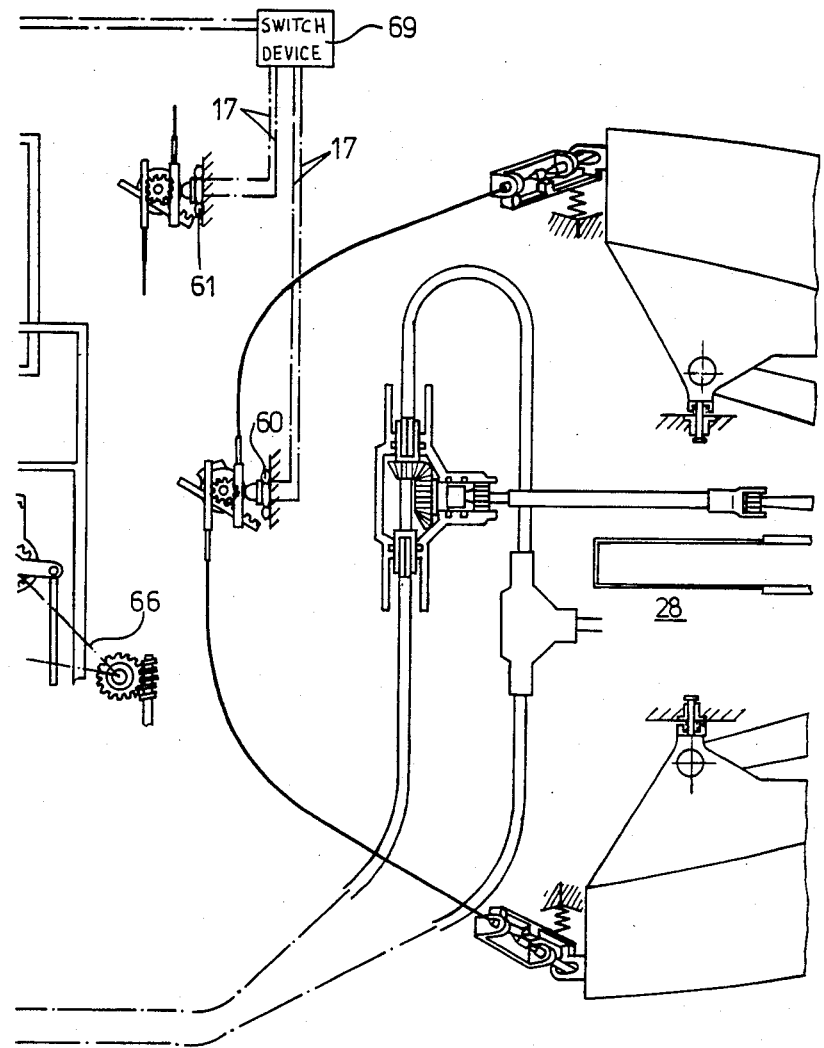

FIGS. 5A and 5B show an alternative arrangement to that in FIGS. 4A and 4B in that, instead of the two optical-electrical counting devices 87 and 88, inductive rotation sensors 160 and 161 are utilized. The sensors 160 and 161 are disposed on one of the shafts of the worm gearing 39 driven by the air motor 20 or alternatively on one of the shafts of its rotary members 25, 26. The difference in the number of revolutions of the two air motors 20 as measured by the rotary bodies 25,26 thereof or the worm gear shafts is detected by the rotation sensors 160, 161. All of the other operations take place in the same manner as indicated in FIGS. 4A and 4B. The electric error unit is denoted at 162. Vent valves 13 and 14 are employed and operated as explained in FIGS. 1A and 1B.

Figure 6:
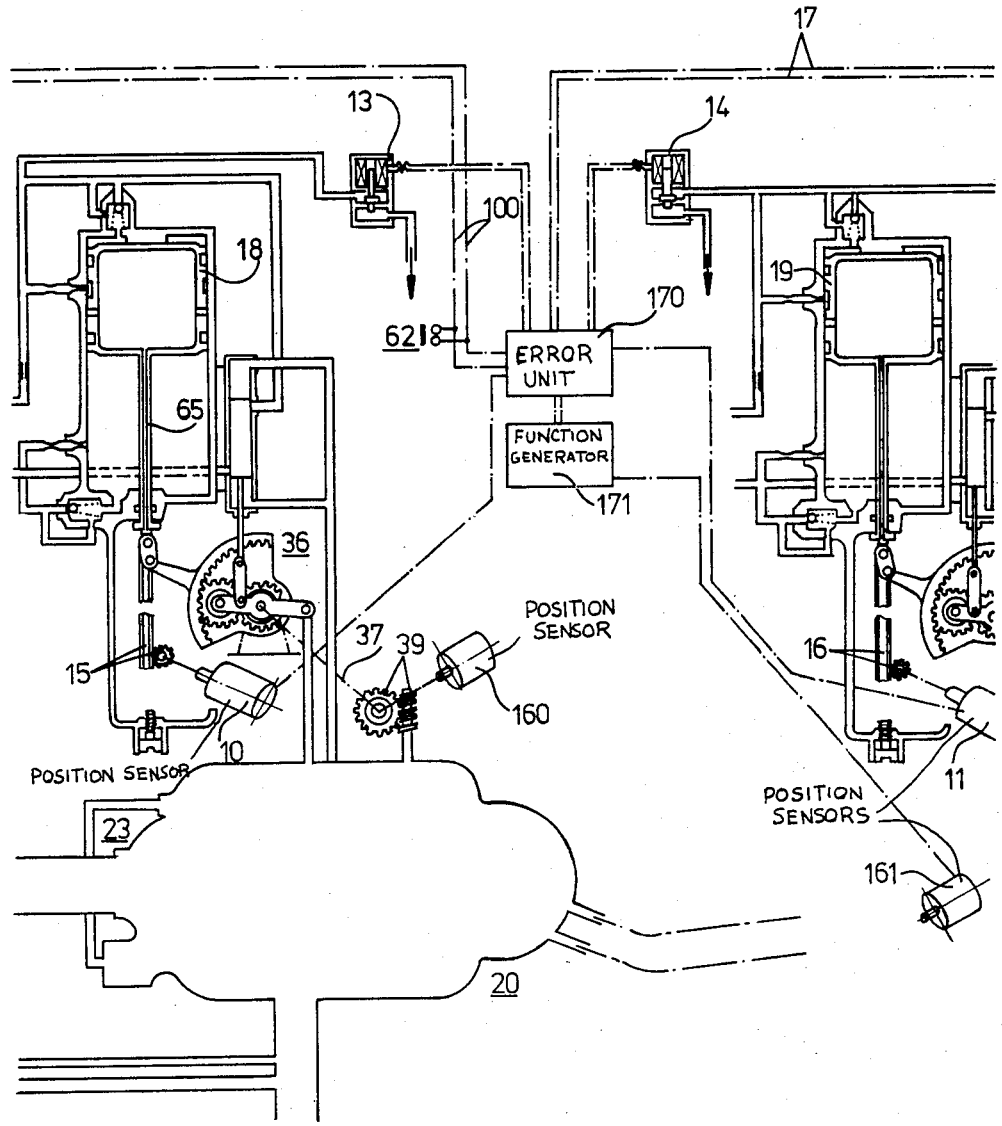
FIG. 6 shows a modified portion of the embodiment of FIG. 5A.

Referring to FIG. 6, the displacement travel of the input pistons 18 and 19 is measured by the inductive rotary sensors 10 and 11 and that at the outputs of the displacement system by the inductive rotary sensors 160 and 161. Synchronization is obtained by venting the cylinders containing the input pistons 18 and 19. The following procedure takes place: the difference between the strokes of the two input pistons 18 and 19 is measured by the two inductive rotary sensors 10 and 11 which, as in accordance with FIG. 1A, are actuated by the piston rods 65 of the input pistons 18 and 19 or the rack gearing 15 and 16. The measured values of the displacement travel are fed into an electric error unit 170. The values of any corresponding error signals are modified by a function generator 171 which is supplied with signals from the rotary sensor 160 and 161 driven, as in accordance with FIG. 5A, by the air motors 20. The synchronizing of the extension of the flaps is obtained by the electric error unit 170 by venting of the faster input piston 18 or 19 via the associated vent valve 13 or 14, which therefore depends on the signals of the inputs and outputs of the displacement system. In this arrangement, the electric time delay circuit 17 is also provided for the purpose previously disclosed.

The structural unit composed of elements 20,23,32,33 has been shown only in outline in FIGS. 2A, 5A and 6 for the sake of simplicity. Its internal construction is identical to that of the structural unit shown in FIGS. 1A, 3A and 4A.

From the above, it is seen that according to the invention, there is provided apparatus for the synchronized displacement of the two thrust reversers 24 of two jet engines of an airplane comprising first and second systems for displacing the respective thrust reversers 24, each system including compressed air motor 20 with associated valve means 23 for controlling the operation of the motor and means for operating the valve means for controlling the displacement of the respective motor. In the embodiments of FIGS. 1A,3A,4A,5A and 6, the operation of the valve means is effected by the pistons 18 and 19 whereas in the embodiment of FIG. 2A, the displacement of the valve means is effected by the electric motors 80 and 81. In order to synchronize the displacement of the thrust reversers, the disclosed synchronizing means measures the displacement in the first and second systems at respective corresponding locations and controls the operation of the first and second motors 20 such that the displacements of the thrust reversers 24 are equalized.

The apparatus carries out a method in which each thrust reverser 24 is displaced by its respective motor 20 under the control of compressed air via valve 27. The displacement of the thrust reversers is synchronized by the steps of measuring the displacement at respective corresponding locations in the drive system from each motor to its associated thrust reverser, comparing such measured displacements and equalizing the displacements by regulating the control of the flow of compressed air to the motors.

Although the invention has been described in relation to specific embodiments thereof, it will become apparent to those skilled in the art that numerous modifications and variations can be made without departing from the scope and spirit of the invention as defined by the attached claims.

What is claimed is:

1. Apparatus for the synchronized displacement of two thrust reversers for two jet engines of an airplane, comprising first and second system means for displacing respective thrust reversers, each system means including a compressed air motor means; valve means for controlling the operation of said motor means by controlling the flow of compressed air thereto; and setter means connected to said valve means for operating said valve means for controlling the displacement of the respective motor means; and synchronizing means for automatically synchronizing the displacement of the two thrust reversers including means for measuring displacements in the first and second system means at respective corresponding locations, comparing means for comparing the displacements measured in the first and second system means and means connected to the comparing means and to said setter means of said first and second system means for controlling the operation of said first and second motor means in response to the comparison of the displacements measured such that the displacements of the two thrust reversers by the respective motor means are automatically equalized.

2. Apparatus as claimed in claim 1 wherein said means for operating each of said valve means comprises a piston means.

3. Apparatus as claimed in claim 2 wherein said synchronizing means comprises a displacement sensor in each setter means operatively associated with the respective piston means for measuring travel of said piston means, and means coupled to the displacement sensors of the two setter means for comparing the travel of the piston means thereof.

4. Apparatus as claimed in claim 1 wherein said setter means for operating each of said valve means comprises an electric motor, and electronic control means coupled to the electric motors for driving the same, said synchronizing means comprising sensor means in each system responsive to the drive of the respective motor, said comparing means being in said electronic control means for comparing the output of said sensor means to control said motors and equalize the displacements of said valve means.

5. Apparatus as claimed in claim 5 wherein said displacement measuring means comprises counter means responsive to the displacement output of each said motor means, said comparing means comprising error means coupled to the counter means of the respective motor means for comparing the outputs thereof and for sending a signal to said electronic means when said outputs are unequal in order for said electronic control means to control said motor means to equalize said outputs.

6. Apparatus as claimed in claim 5 wherein each said motor means drives a rotary output shaft, said counter means measuring the magnitude of angular rotation of the respective output shaft.

7. Apparatus as claimed in claim 1 wherein said displacement measuring means comprises a mechanical differential means for measuring displacement at said respective corresponding locations.

8. Apparatus as claimed in claim 7 wherein said mechanical differential means includes two displacement sensors each coupled to a respective air motor means and a mechanical coupling between said sensors for producing an output in response to differential output of said displacement sensors.

9. Apparatus as claimed in claim 8 wherein said displacement sensors comprise respective rotatable threaded shafts held axially in parallel, spaced relation and driven in rotation by the associated motor means, a traveling nut threaded on each shaft for axial displacement therealong in accordance with the magnitude of rotation of said shaft, a pivotal swing arm between said shafts, a socket slidably mounted on said swing arm, and means pivotably connecting said socket with each of said traveling nuts whereby said swing arm undergoes pivotal movement upon differential displacement of said traveling nuts.

10. Apparatus as claimed in claim 9 wherein said setter means for operating each of said valve means comprises a piston means operated by compressed air, said synchronizing means further comprising valve means associated with each piston means for controlling pressurization thereof by compressed air, and means for controlling said valve means in response to pivotal movement of said swing arm.

11. Apparatus as claimed in claim 10 wherein said means pivotably connecting said socket with each of said traveling nuts comprises rods pivotably connected to said socket and to respective traveling nuts to form a knee-joint linkage.

12. Apparatus as claimed in claim 11 wherein said valve means comprises valves on opposite sides of said swing lever at a region thereof remote from the pivot axis of said swing arm.

13. Apparatus as claimed in claim 1 wherein said displacement measuring means comprises sensor means responsive to the output drive of each said air motor means, said comparing means comparing the outputs of the sensor means of the air motor means.

14. Apparatus as claimed in claim 1 comprising means coupling each of the air motor means to a respective thrust reverser, said displacement measuring means including means for measuring the magnitude of displacement of the coupling means, said comparing means comparing the magnitude of displacement of the respective coupling means to determine any inequality therebetween.

15. Apparatus as claimed in claim 14 wherein said coupling means include respective rotatable shafts, said measuring means measuring the angular travel of the respective rotatable shaft of the associated system means.

16. Apparatus as claimed in claim 15 wherein said measuring means comprises an optical electrical counting device including a counting disk fixed on the associated shaft.

17. Apparatus as claimed in claim 2 wherein said displacement measuring means comprises a displacement sensor in each setter means operatively associated with the respective piston means for measuring travel of said piston means, said comparing means comprising error means coupled to the displacement sensors of the two setter means for comparing the travel of the piston means thereof, a further displacement sensor in each system means responsive to the output drive of the respective motor means, and generator means for comparing the magnitude of rotation of the respective motor means for producing an output signal for additional input to said error means.

18. Apparatus as claimed in claim 1 wherein said means for operating each of said valve means comprises a piston means operated by compressed air, said means for controlling the motor means comprising valve means associated with each piston means for controlling pressurization thereof by compressed air.

19. Apparatus as claimed in claim 1 wherein said displacement measuring means of said synchronizing means comprises sensor means in respective system means for measuring displacement at said respective corresponding locations, said sensor means comprising an inductive rotary sensor.

20. Apparatus as claimed in claim 19 wherein said means for operating each of said valve means comprises a piston means, said piston means including a piston rod with a rack thereon, a gear engaging said rack for being driven in rotation in relation to the displacement of said piston rod, said inductive rotary sensor being connected to each associated gear whereby said sensor means in each system means measures the displacement of the piston means via said piston rod thereof.

* * * * *